Aug. 10, 1926.

R. H. MUELLER ET AL 1,595,309

FERRULE AND METHOD OF MAKING SAME

Filed May 25, 1923   2 Sheets-Sheet 1

Inventor
Robert H. Mueller.
Lucien W. Mueller.

By Cushman, Bryant & Darby
Attorneys

Patented Aug. 10, 1926.

1,595,309

UNITED STATES PATENT OFFICE.

ROBERT H. MUELLER AND LUCIEN W. MUELLER, OF DECATUR, ILLINOIS, ASSIGNORS TO ADOLPH MUELLER, TRUSTEE, OF DECATUR, ILLINOIS.

FERRULE AND METHOD OF MAKING SAME.

Application filed May 25, 1923. Serial No. 641,524.

The present invention relates to a new and improved ferrule and method of forming same, and has to do more particularly with ferrules used in plumbing work, being especially adapted for use in making soil pipe joints to lead pipe, although it will be understood that we do not limit its use to that particular type of joint.

It has for its object to produce a plumbing ferrule which may be expeditiously made; which will be free from porosity, so as to ensure against the leakage of liquid or gas through its walls; which will take the solder used in making the joint between the ferrule and the lead pipe with which they are used without danger of the zinc in the brass of the ferrule affecting the solder used for wiping the joint; and, furthermore, ensure the formation of an absolutely tight joint at the meeting point of the ferrule and lead pipe.

The objections to the cast ferrule are numerous and well founded. Ferrules are used by all plumbers in large quantities, the result of which is an extremely severe competition among manufacturers at a very low selling price. This competition has necessitated cutting the cost of the casting method to the minimum, and further reduction in cost is possible only by radical changes in design and manufacturing methods. The desire and effort of manufacturers to reduce the cost of the cast ferrule has induced many to employ materials and workmanship of the lowest grade obtainable, resulting in, as must always be true, particularly in a casting, an article of very inferior quality, it being defective in that it has porous areas which allow the escape of sewage and sewer gas into the building. Furthermore, it is defective in having material of a high zinc content and impurities, such as aluminum, iron, nickel, antimony, and others, all of which has a very detrimental effect on the solder used in wiping the joint, causing a loss of solder to the plumber and a defective joint to the consumer. Further cause for condemnation of the casting method, regardless of quality of material and workmanship, resides in the fact that casting losses are largely due to the design of the ferrule, which has relatively thin walls, and this loss must be absorbed by the usable ferrules produced, thereby precluding further decrease in cost of production.

In explanation of the manner in which zinc, and other elements become mixed with the solder, it should be borne in mind that a plumber, when wiping a joint, pours the molten solder on the joint, and when the joint is finished, he throws back into the melting pot all of the solder not used in completing the joint. This surplus metal, when thrown back into the pot, carrying with it the zinc and impurities referred to, destroys the cohesive properties of the otherwise pure solder in the pot.

In order that the invention may be readily understood by those skilled in the art, we have shown, in the accompanying drawings, physical embodiments of our invention, and in said drawings.

Figure 1:
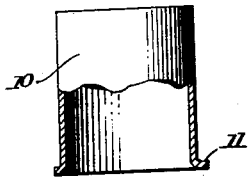
Fig. 1 is a view partly in elevation and partly in section of our improved plumbing ferrule.

Referring to the drawings by numbers, like numbers indicating like parts in the several views, 10 indicates a wrought nonferrous alloy flanged ferrule, which may be formed by cutting a short piece from a tube and flanging one end thereof, by drawing from sheet metal, by a forging process, or in any approved or satisfactory method. Wrought non-ferrous ferrules have very considerable advantages over cast ferrules, for the reason that ferrules may be very cheaply and quickly made in any desired lengths, by any of the methods suggested, and when so made will be entirely free from the porosity of cast ferrules, and furthermore, will have a smooth finished surface, so that the necessity of grinding or finishing the exterior surface which exists where cast ferrules are used, is done away with.

Although the non-ferrous material necessary to successful drawing, extruding or forging is of necessity always of the highest grade obtainable, it generally contains a large percentage of zinc, and upon the application of the molten solder used in wiping the joint between the ferrule and the lead pipe, the zinc in the material of the ferrule, due to the temperature of the molten solder, diffuses into the bath of solder being used to wipe the joint. This diffusion of the zinc or other impurities causes the solder to deteriorate and gradually to lose its cohesive qualities, as the surplus metal is remelted from time to time, thereby finally rendering it useless for further joint wiping.

The ferrule 10 shown in Fig. 1, has formed at one end thereof, the flange 11, which flange may be very readily spun down, pressed, or forged, as shown, so as to give proper formation for coupling the ferrule with its attached pipe into the line.

Figure 2:
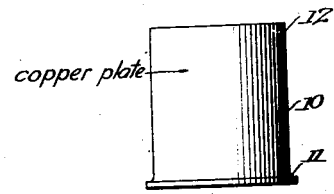
Fig. 2 shows the flanged ferrule of Fig. 1 plated with copper, this being a step in the development.
Figure 3:
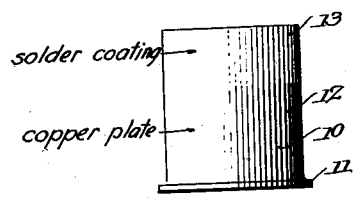
Fig. 3 shows the copper plated ferrule of Fig. 2 having a portion of its exterior surface coated with solder, the upper end of the ferrule being shown coated in this illustration, the coating of the copper plated ferrule being another step in the development.

In order to prevent the diffusing of the zinc in the non-ferrous metal ferrule, the flanged ferrule of Fig. 1 will preferably be subjected to a plating operation, Fig. 2 showing conventionally the flanged ferrule of Fig. 1 plated with copper 12 in any approved fashion, so that a copper plated ferrule is produced. This copper skin or plate will prevent the contact of the zinc of the brass ferrule with the solder, thereby preventing diffusion of the zinc into the solder. Moreover, the copper will itself combine with the solder, which has the effect of causing the solder to adhere firmly to the brass ferrule, and make a perfect joint. By thus imposing a plating of copper on the brass ferrule, the difficulty heretofore experienced of diffusion of the zinc is avoided, and the strength of the joint is increased.

While we have adopted copper as a good medium to plate the brass ferrule with on account of its cheapness, chemical affinity for solder, and the ease with which the plating may be done, it will be understood that other metals which may be readily deposited, which have an affinity for solder, and which will not cause deterioration of the solder, may be utilized.

While the copper plated ferrule of Fig. 2 will make an excellent joint, it requires too delicate handling to be commercially feasible, as the copper plate will, after exposure to air, lose its affinity for adhesion to solder, which can only be revived by cleaning with acid, or replating, to eliminate the skin formed by oxidization. To overcome this difficulty, we preferably subject the copper plated area of the ferrule to a solder bath, called "tinning", in the trade, so as to give it a surface which will readily take the mass of solder used in wiping the joint and thus form an absolutely liquid and gas tight joint. This "tinned" or solder coated surface 13 will give a very intimate adhesion; will form a very close union with the solder, and will result in an absolutely tight joint, the solder acting satisfactorily in contact with the "tinned" or coated surface.

Figure 4:
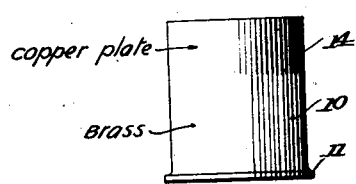
Fig. 4 shows a ferrule similar to that shown in Fig. 2 with a portion only plated with copper, the illustration in Fig. 4 showing the upper end of the ferrule having a copper plate.
Figure 5:
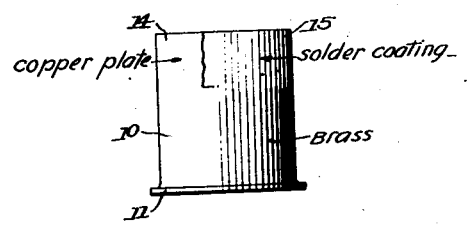
Fig. 5 shows the ferrule of Fig. 4 with the copper plated portion coated with solder.

In Fig. 4 a slightly different development of the invention is shown, in which form, instead of plating the entire ferrule 10 with copper, a portion 14 only of the non-ferrous metal ferrule 10 is plated, and this coppered portion 14 will then preferably be subjected to a "tinning" operation so as to give a "tinned" section 15 of sufficient area to take the solder and give a liquid and gas tight joint.

Figure 6:
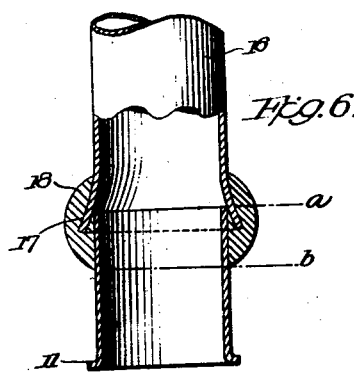
Fig. 6 shows the joint formed by the ferrule, the flanged end of the lead pipe, and the solder with which the joint is sealed.

In Fig. 6 a wiped joint of one type is shown, in which the lead pipe 16 is provided with a flanged end 17 to receive the ferrule, the upper end of which, between the dotted lines *a* and *b*, is "tinned" or solder coated over copper plate as heretofore described. About the joint formed between the pipe 16 and ferrule 10 the solder 18 will be applied after any approved fashion, and as will be clear from Fig. 6, the molten solder will flow into and about the joint, alloying with the "tinned" area of the copper plated ferrule so as to produce a sound joint, free from imperfections because of either porosity in the ferrule 10, or because of lack of adhesion between the ferrule and the solder. The molten solder cannot cause diffusion of the zinc content of the ferrule because of the protection afforded by the copper plating.

Figure 7:
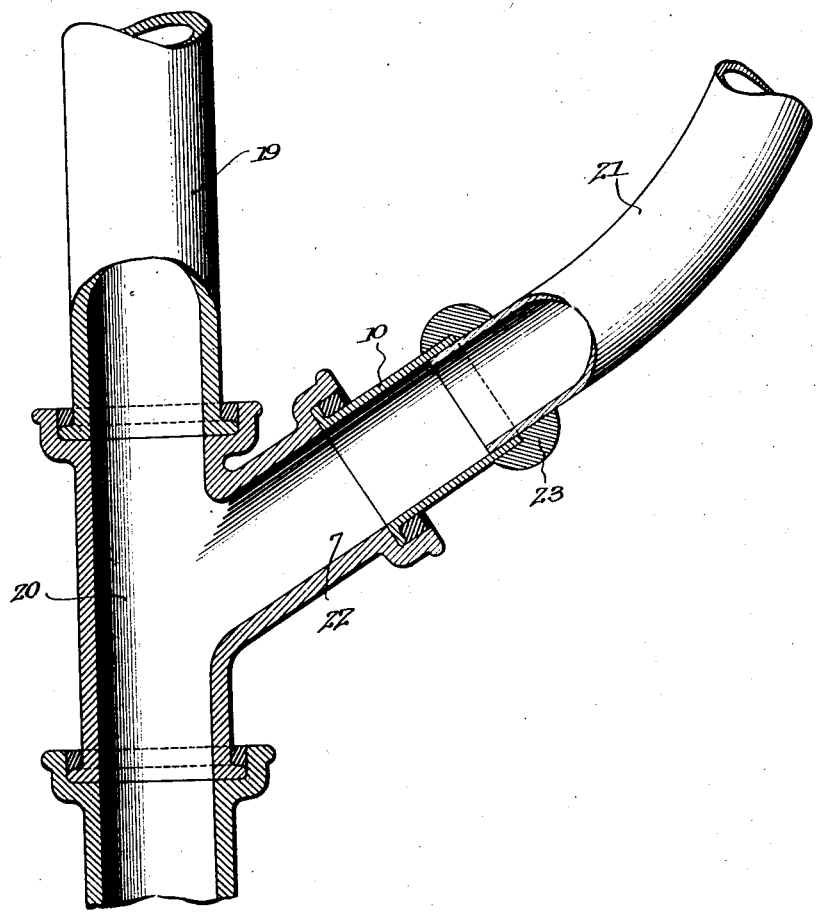
Fig. 7 shows one use to which ferrules may, in accordance with our invention, be put.

In Fig. 7 we have shown a soil pipe connection with which the ferrule may be very conveniently used, and in said figure, 19 indicates generally the vertical line of soil pipe in which, as here shown, is the hub section 20. The branch connection 21, usually of lead pipe, will be coupled to the hub 22 of the section 20 by the wrought non-ferrous metal ferrule 10, the flanged end of which, as shown in Fig. 7, will be calked into the socket of the hub, the other end of the ferrule 10 being soldered to the lead pipe 21 by the wiped joint 23, as shown.

There is a very decided advantage in the use of the ferrule of our invention for this purpose. Cast ferrule, as distinguished from the wrought ferrule herein disclosed, are objectionable because of the danger of iron getting into the metal mixture of which the ferrule is cast, and, even though such ferrules are tested when put into the line, they are likely, after use, to become porous and faulty because of the rusting out of the iron content, permitting noxious gases to escape.

A ferrule wrought of non-ferrous metal in accordance with our invention is not open to such objection, and ensures always a tight joint where it is used.

While we have shown a particular embodiment of our invention, it will be understood that such changes as involve merely the skill of the mechanic or the adoption of equivalent expedients may be made and yet be within the range of our invention.

For example, in the illustration and description herewith, we have shown a straight short pattern of ferrule. Obviously, our invention can be practiced with a straight long pattern of ferrule; with eighth or quarter bend ferrules; with taper reduced, long or short offsets; and, in fact, with any type of ferrule, regardless of its specific design.

We claim:

1. As a new article of manufacture, a non-ferrous metal plumbing ferrule coated with metal having a different fusion point than that of the metal from which the ferrule is formed, and a second coat of non-oxidizing metal having a different fusion point than that of said first-named coat.

2. As a new article of manufacture, a non-ferrous metal plumbing ferrule having a coat of metal having a higher fusion point than that of the metal from which the ferrule is formed and a second coat of non-oxidizing metal having a lower fusion point than that of said first-named coat.

3. As a new article of manufacture, a wrought non-ferrous metal plumbing ferrule coated with metal having a fusion point above that of the metal of the ferrule, and above the temperature of the molten solder used in wiping the joint with said ferrule, and a second coat of solder over said first named coat.

4. As a new article of manufacture, a wrought brass plumbing ferrule, having a coat or covering of copper.

5. As a new article of manufacture, a wrought brass plumbing ferrule having a coat or covering of copper, and a coat of solder on said first named metal coat.

In testimony whereof we have hereunto set our hands.

ROBERT H. MUELLER.
LUCIEN W. MUELLER.